United States Patent [19]

Grimm et al.

[11] Patent Number: 5,054,425

[45] Date of Patent: Oct. 8, 1991

[54] METHOD OF MILKING AN ANIMAL

[75] Inventors: Hartmut Grimm, Stuttgart; Karl Rabold, Schwäbisch Hall-Wackershofen, both of Fed. Rep. of Germany

[73] Assignee: Alfa-Laval Agriculture International AB, Tumba, Sweden

[21] Appl. No.: 571,628

[22] PCT Filed: Mar. 3, 1989

[86] PCT No.: PCT/SE89/00100

§ 371 Date: Aug. 31, 1990

§ 102(e) Date: Aug. 31, 1990

[87] PCT Pub. No.: WO89/07884

PCT Pub. Date: Sep. 8, 1989

[30] Foreign Application Priority Data

Mar. 5, 1988 [DE] Fed. Rep. of Germany ....... 3807256

[51] Int. Cl.⁵ .................................................. A01J 3/00
[52] U.S. Cl. .................................................. 119/14.02
[58] Field of Search ............... 119/14.02, 14.01, 14.08, 119/14.14

[56] References Cited

U.S. PATENT DOCUMENTS

| | | | |
|---|---|---|---|
| 4,033,295 | 7/1977 | Soderlund | 119/14.44 |
| 4,198,999 | 4/1980 | Boudreau | 119/14.02 X |
| 4,211,184 | 7/1980 | Abrahamson | 119/14.02 |
| 4,572,104 | 2/1986 | Rubino | 119/14.02 |

FOREIGN PATENT DOCUMENTS

| | | |
|---|---|---|
| 125502 | 3/1973 | Denmark . |
| 348092 | 8/1972 | Sweden . |
| 453875 | 3/1988 | Sweden . |

*Primary Examiner*—Gene Mancene
*Assistant Examiner*—R. Thomas Price
*Attorney, Agent, or Firm*—Hovey, Williams, Timmons & Collins

[57] ABSTRACT

In a method of milking an animal, the conditions of the milking operation are substantially stable during a main milking phase and are unintentionally changed during a terminating milking phase. According to the invention, at least one unintentional change in the milking operation conditions during at least one initial milking operation is sensed, at least one milking parameter is registered in response to said sensed unintentional change, and each said registered parameter is utilized to change the milking conditions of one or more following milking operations for the same animal before each said sensed unintentional change is expected to occur.

27 Claims, No Drawings

METHOD OF MILKING AN ANIMAL

BACKGROUND OF THE INVENTION

A. Field of the Invention

The present invention relates to a method of milking an animal by means of a milking machine, the invention is intended to address problems associated with which are substantially stable during a main milking phase, when the milk flow is substantially constant, and thereafter the milk flow is unintentionally decreased due to a change in teat liner position relative to the animal's teat during a terminating milking phase, during which the milk flow starts decreasing.

B. Description of the Prior Art

The milking machine usually comprises a cluster of teat cups, each teat cup containing a liner forming a pulsation chamber therebetween. During milking the pulsation chamber is subjected to a pulsating pressure varying between a low pressure and a high pressure on the other hand, the interior of the liner is subjected to a constant sub-pressure or vacuum which is substantially equal to said low pressure in the pulsation chamber. When the milking conditions are stable during the main milking phase, the teats are kept in the liners in an intended positions and the milk is yielded from the udder in a substantially constant flow of milk.

During the terminating milking phase, the position of each liner relative to its teat changes unintentionally from the intended position in spite of the fact that the operation of the milking machine is unchanged. This change in position throttles the milk flow passages in the teats, so that the milk flow finally ceases resulting in an undesirable rest amount of milk in the udder.

The cause of said change in position of each liner relative to its teat will be explained below.

When the main part of the milk in the udder has been extracted during milking, the pressure in the udder drops resulting in a decrease of the milk flow from the udder. Under the influence from said constant sub-pressure prevailing in the liner below the tip of each teat and because of said decreasing milk flow, each teat will be slacker and slacker and its friction engagement with the liner will be weaker and weaker. Finally each teat slides deeper into its liner, so that the lips surrounding the upper opening of the latter throttles or constricts the milk flow passage between the interior of the udder and the interior of the teat because of udder tissues sucked into the liner. After a while, the milk flow through the teats is completely stopped by the sucking of udder tissues into the liners, so that a rest amount of milk is left in the udder.

The rest milk cannot be extracted by means of the milking machine without a time-consuming manual manipulation of the teat cups, i.e. the teat cups need to be pulled downwardly. However, before the teat cups can be manually manipulated to gain the rest milk, usually some time will pass during which the animal be dry-milked, i.e. there is no or an insignificant flow of milk in the teats. Such a dry-milking treats the teats ungently and might irritate the animal.

To avoid dry-milking, some known types of milking machines automatically removes the teat cups from the teats as soon as the milk flow has ceased. Thus, the rest milk is not extracted. This means the advantage, besides the advantage of avoiding dry-milking, that no time-consuming manual manipulation of the teat cups is necessary. A drawback is that the lactation production of milk be reduced, the amount of this reduction being dependent on the amount of the rest milk. Another drawback is that leaving the rest milk could increase the risk of infections arising in the udder. As much of the rest milk as possible should always be extracted.

There are attempts made to control a milking machine in order to counteract said unintentional change in the conditions of the milking operation, so that the rest milk is eliminated or at least substantially reduced. According to one such an attempt, during the terminating milking phase, the sub-pressure in the liner is reduced in response to a sensed decrease of the milk flow from the main milk flow to a predetermined part of the latter. By this measure, each liner should remain in a sufficient friction engagement with its teat, since said reduced sub-pressure causes a corresponding reduction of the sub-pressure prevailing in the teat, so that the teat will not be slacked. However, in practice it has been proved that the reduction of the rest milk in most milking occasions is rather insignificant. The benefit is that, because of the reduced sub-pressure, the teats are treated more gently when dry-milking occurs.

The reason for the failure of the above described attempt is that the liner often very rapidly slides upwards on the teat as soon as the milk flow starts decreasing from the main milking phase milk flow. Once the liner has slid up to an upper position on the teat, it remains in that position no matter if the milking machine is controlled, such that the various pressures in the teat cup are changed and/or the pulsation characteristics are changed. Thus, it will often be too late to change the sub-pressure in each liner in response to said change in the milk flow, because each liner has already slid more or less upwards on the teat.

SUMMARY OF THE INVENTION

The object of the present invention is to provide a new method of milking, which results in an elimination of or at least a significant reduction of the rest milk in the udder of the animal.

This object is obtained by a method of the kind initially stated, which mainly is characterized by sensing at least one unintentional change in the milking operation conditions (such as, for example, a change in sub-pressure or vacuum on the teats) during at least one initial milking operation, recording at least one milking operation parameter in response such as milk flow to said sensed unintentional change in the milking operation conditions, and utilizing each said recorded parameter to change the milking conditions of one or more following milking operations for the same animal before each said sensed unintentional change in the milking conditions is expected to occur.

Hereby, the advantage is gained that the milking conditions can be change in a controlled manner and in time, so that any unwanted unintentional change in the milking conditions (a change of the position of each liner relative to its teat) is avoided or at least counteracted.

DESCRIPTION OF THE PREFERRED EMBODIMENT

During an initial milking operation, preferably an unintentional decrease of the milk flow is sensed. Alternatively or in combination, an unintentional decrease of the pressure in each liner above the tip of its teat and/or an unintentional change in the position of each liner relative to its teat could be sensed.

The milking operation parameter to be recorded preferably is the milk flow, but it could also be the retardation of the milk flow, the time of the milk flow or the amount of milk collected from the animal. Of course, it would be possible to use a combination of the abovementioned recorded parameters.

The milking conditions are preferably changed during said one or more following milking operations by decreasing a sub-pressure acting on the teats, possibly in combination with one or more of the following alternatives:

In a machine comprising at least one teat cup with a liner forming a pulsation chamber therebetween, said pulsation chamber being subjected to a pulsating pressure varying between a low pressure and a high pressure, the milking conditions are changed by:

1. Increasing the frequency of the pulsation pressure. This results in that each liner will not have sufficient time to open completely during each pulsation cycle, whereby the friction engagement between each liner and its teat will be maintained.
2. Decreasing the pulsating ratio of the low pressure to the high pressure. This will also result in that each liner will not have sufficient time to open completely during each pulsation cycle.
3. Increasing the low pressure in the pulsation chamber. This will result in a reduction of the opening capability of each liner.
4. Reducing the velocity of movement of each liner when opening or closing the liner. This will also result in that each liner will not have sufficient time to open completely during each pulsation cycle.
5. Constantly subjecting said pulsation chamber to said high pressure. This will result in that each liner will be in a constant friction engagement with its teat.

Of course, it would be possible to use a combination of the abovementioned measures 1-5 to change the milking conditions. The invention is described in the following by way of an example.

A cow is milked in an initial milking operation by means of a milking machine, which is operated in a constant manner. The milk flow is sensed and the value of the milk flow rate is recorded when the milk flow has decreased from the main flow to a predetermined level of milk flow. Preferably, several such recorded values of the milk flow is collected from subsequent initial milking operations and a mean value of the milk flow with standard deviation is calculated from the collected values of milk flow. Then, said calculated mean value of the milk flow is utilized for controlling each of the following milking operations, such that in response to the sensed value of the milk flow in each following operation the sub-pressure below the teats in the liners is decreased before the milk flow has decreased to said mean value of the milk flow added with the standard deviation of the latter.

Alternatively, only one registered value of the milk flow obtained from one initial milking operation could be utilized for controlling the following milking operations, on condition that the sub-pressure is decreased well before the milk flow has decreased to this last mentioned value.

We claim:

1. A method of milking an animal comprising the steps of:

connecting a milking machine to the teats of an animal;
   operating the milking machine to treat the teats of the animal, such that milk is extracted from the teats;
   controlling the milking machine to operate at a stable state, such that a substantially constant flow of milk is ejected from the teats;
   sensing an uncontrolled change in a variable related to the machine treatment of the teats;
   recording a milk ejection variable in response to said sensed uncontrolled change; and
   utilizing said recorded milk ejection variable to control the milking machine in a subsequent milking of the animal, such that said uncontrolled change in said teat treatment variable is counteracted before it is expected to occur.

2. The method of claim 1, wherein an uncontrolled decrease in the milk flow is sensed.

3. The method of claim 1, wherein the milking machine is connected to the teats via teat cup liners, and an uncontrolled decrease in the pressure in each liner above the tip of the teat is sensed.

4. The method of claim 1, wherein the milking machine is connected to the teats via teat cup liners, and an uncontrolled change in the position of each teat cup liner relative to the teat in the teat cup liner is sensed.

5. The method of claim 1, wherein the milk flow ejected from the teats is recorded in response to said uncontrolled change in said teat treatment variable.

6. The method of claim 1, wherein the retardation of the milk flow from the teats is recorded in response to said uncontrolled change in said teat treatment variable.

7. The method of claim 1, wherein the time of the milk flow from the teats is recorded in response to said uncontrolled change in said teat treatment variable.

8. The method of claim 1, wherein the amount of milk extracted from the teats is recorded in response to said uncontrolled in said teat treatment variable.

9. The method of claim 1, wherein the milking machine subjects the teats to a subpressure, and said uncontrolled change in said teat treatment variable is counteracted in said subsequent milking be decreasing said subpressure.

10. The method of claim 1, wherein the milking machine is connected to the teats via teat cup liners, the milking machine subjecting the teat cup liners to an exterior pulsating pressure, and said uncontrolled change in said teat treatment variable is counteracted in said subsequent milking by increasing the frequency of the pulsating pressure.

11. The method of claim 1, wherein the milking machine is connected to the teats via teat cup liners, the milking machine subjecting the teat cup liners to an exterior pulsating pressure varying between a low pressure and a high pressure, and said uncontrolled change in said teat treatment variable is counteracted in said subsequent milking by decreasing the pulsating ratio of the low pressure to the high pressure.

12. The method of claim 1, wherein the milking machine is connected to the teats via teat cup liners, the milking machine subjecting the teat cup liners to an exterior pulsating pressure varying between a low pressure and a high pressure, and said uncontrolled change in said teat treatment variable is counteracted in said subsequent milking by increasing the low pressure.

13. The method of claim 1, wherein the milking machine is connected to the teats via teat cup liners, the milking machine subjecting the teat cup liners to an exterior pulsating pressure to cause the teat cup liners to alternately open and close the inner passages of the teat cup liners, and said uncontolled in said teat treatment variable is counteracted in said subsequent milking by reducing the velocity of the movement of the teat cup liners when opening and closing the teat cup liners.

14. The method of claim 1, wherein the milking mahine is connected to the teats via teat cup liners, the milking machine subjecting the teat cup liners to an exterior pulsating pressure varying between a low pressure and a high pressure, and said uncontrolled change in said teat treatment variable is counteracted in said subsequent milking by changing said pulsating pressure into a constant pressure equated with said high pressure.

15. A method of milking an animal having at least one teat using a milking machine capable of operation at different milk-extracting levels of operation, said machine having at least one teat cup containing a liner, said liner having an interior and defining a pulsation chamber between said liner and said teat cup, said method comprising the steps of:

initially milking said animal by locating said teat within a liner at an intended position relative to the liner, operating said milking machine at a first milk-extracting level of operation, monitoring the flow of milk from said animal during operation of said machine at said first level of operation thereof until a decrease in milk flow from the animal resulting from movement of the teat relative deeper into the liner is observed, and recording a milking parameter value which corresponds to said decrease in milk flow; and during a subsequent milking operation, locating said teat within a liner, operating said milking machine at substantially said first level of operation thereof, sensing said parameter during said subsequent milking operation, and, prior to said parameter reaching said recorded value, changing the operation of said milking machine for operation thereof at a second milkextracting level of operation different from said first level in order to inhibit milk flow-blocking movement of said teat deeper into said liner.

16. A method of milking an animal as set forth in claim 15, wherein said parameter includes the milk flow from said animal.

17. A method of milking an animal as set forth in claim 29, wherein said parameter includes the retardation of milk flow from said animal.

18. A method of milking an animal as set forth in claim 15, wherein said parameter includes the time of the milk flow from said animal.

19. A method of milking an animal as set forth in claim 15, wherein said parameter includes the amount of milk milked from said animal.

20. A method of milking an animal as set forth in claim 15, wherein said parameter includes the distance said liner has moved on said teat from said intended position.

21. A method of milking an animal as set forth in claim 15, wherein said parameter includes the pressure in said liner above the tip of the teat.

22. A method of milking an animal as set forth in claim 15, wherein said milking machine operation includes the creation of a vacuum level in the interior of the liner, and wherein said second level of operation includes a second vacuum level having a decreased value relative to the vacuum level of said first level of operation.

23. A method of milking an animal as set forth in claim 15, wherein said milking machine operation includes subjecting said pulsation chamber to a pulsating pressure varying between a low pressure and a relatively high pressure, and wherein said second level of operation includes an increase in the frequency of pulsation between said high pressure and said low pressure relative to the frequency of pulsation of said first level of operation.

24. A method of milking an animal as set forth in claim 15, wherein said milking machine operation includes subjecting said pulsation chamber to a pulsating pressure varying between a low pressure and a relatively high pressure, and wherein said second level of operation includes an increase in the pulsating ratio of the high pressure to the low pressure relative to the pulsating ratio of said first level of operation.

25. A method of milking an animal as set forth in claim 15, wherein said milking machine operation includes subjecting said pulsation chamber to a pulsating pressure varying between a low pressure and a relatively high pressure, and wherein said second level of operation includes an increase in the value of the low pressure relative to the value of the low pressure of said first level of operation.

26. A method of milking an animal as set forth in claim 15, wherein said milking machine operation includes subjecting said pulsation to a pulsating pressure varying between a low pressure and a relatively high pressure for causing the liner to alternately open and close an inner passage of the liner at a velocity of movement, and wherein said second level of operation includes reducing the velocity of movement of the liner when operating and closing the liner to a second velocity of movement relative to the velocity of movement of said first level of operation.

27. A method of milking an animal as set forth in claim 15, wherein said milking machine operation includes subjecting said pulsation chamber to a pulsating pressure varying between a low pressure and a relatively high pressure, and wherein said second level of operation includes maintaining said pulsation chamber at said relatively high pressure.

* * * * *